United States Patent [19]

Süess et al.

[11] Patent Number: 5,689,989
[45] Date of Patent: Nov. 25, 1997

[54] METHOD FOR THE ZIGZAG-LIKE FOLDING OF A STRIP-LIKE FOIL

[75] Inventors: Philipp Süess, Seuzach; Martin Bär, Hettlingen; Xaver Stöckli, Richterswil; Rainer Stöckli, Schindellegi, all of Switzerland

[73] Assignee: Sulzer Chemtech AG, Winterthur, Switzerland

[21] Appl. No.: 636,809

[22] Filed: Apr. 24, 1996

[30] Foreign Application Priority Data

Apr. 25, 1995 [EP] European Pat. Off. ............. 95810274

[51] Int. Cl.$^6$ .................................................. B21D 13/08
[52] U.S. Cl. .................................................. 72/187; 72/190
[58] Field of Search .......................... 72/184, 187, 190, 72/196, 452.6

[56] References Cited

U.S. PATENT DOCUMENTS

| 3,005,036 | 10/1961 | Mowatt | 72/196 |
| 3,430,476 | 3/1969 | Duda | 72/190 |

FOREIGN PATENT DOCUMENTS

| 0 377 944 | 7/1990 | European Pat. Off. |
| 463 105 | 7/1928 | Germany |
| 3916156 | 11/1990 | Germany |
| 300097 | 7/1954 | Switzerland |

OTHER PUBLICATIONS

Patent Abstracts of Japan, vol. 6 No. 267 (M-182) [1145], Dec. 25, 1982 & JP-a-57 159221 (Chiyuuou Hatsujiyou K.K.) Oct. 1, 1982, Abstract.

Patent Abstracts of Japan, vol. 8, No. 146 (M-307) Jul. 7, 1984 & JP-A-59 042135 (Shin Nippon Seitetsu) Mar. 8, 1984. Abstract.

Primary Examiner—Lowell A. Larson
Attorney, Agent, or Firm—Townsend and Townsend and Crew LLP

[57] ABSTRACT

The method for the zigzag-like folding of a strip-like foil includes the following steps in an advantageous embodiment:

1. prepleating, whereby a zigzag-like or wave-shaped folding is effected in which the folded edges are formed in cross-section as arcs with a radius of curvature greater than about 1 mm;
2. follow-up forming of each second folded edge in that a coining tool is used to influence the fold angle and to reduce the radius of curvature of the folded edge to a value smaller than 1 mm;
3. follow-up forming of the remaining folded edges in the same manner as during the second step. The follow-up forming steps are executed with tumble pressing devices which respectively include a rotatable toothed roll and a coining tool. The coining tool is drivable by means of an eccentric device and is connected via a pendulum axle with a vertically displaceable slider. The coining tool, in cooperation with a respective tooth of the roll, reduces the radius of curvature of a folded edge and can additionally influence the associated fold angle.

13 Claims, 3 Drawing Sheets

Fig. 1
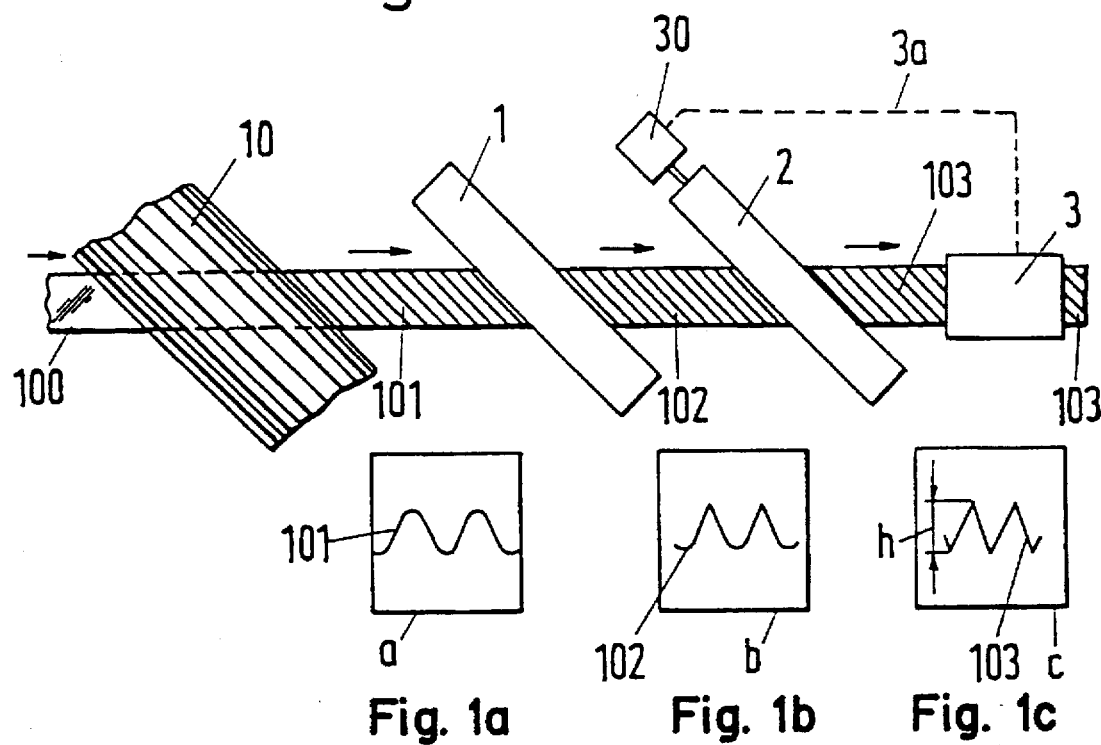
Fig. 1a  Fig. 1b  Fig. 1c
Fig. 2
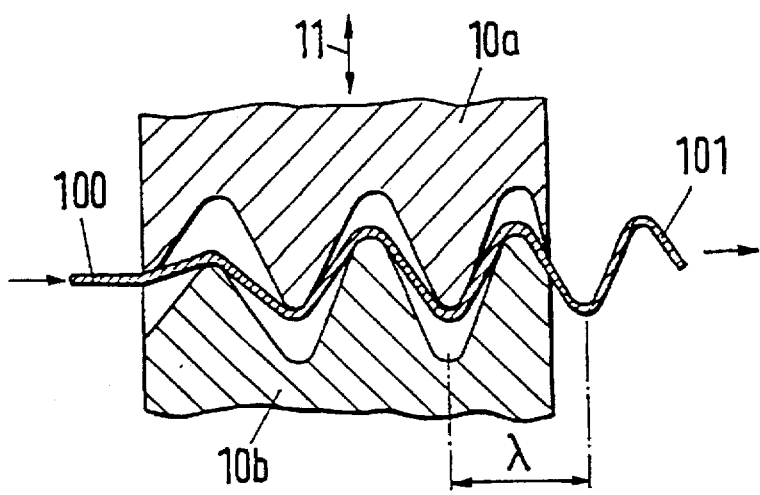

METHOD FOR THE ZIGZAG-LIKE FOLDING OF A STRIP-LIKE FOIL

BACKGROUND OF THE INVENTION

1. Technical Field

The invention relates to a method for the zigzag-like folding of a strip-like foil. It also relates to devices and plants for carrying out the method.

2. Description of the Prior Art

Zigzag-like folded material strips, so-called pleated material strips, are used for the manufacture of packings, for example for material columns and heat exchanger columns. Such packings exist which have additional structural features—for example regularly arranged apertures at predetermined positions—and for which a high precision of the pleating method is required. At the same time, large quantities of pleated foils must be manufacturable at a favorable cost with such a method. The precision that is required cannot be achieved with the pleating methods that are known at the present time.

Cost favorable rolling methods are known for the manufacture of pleated foils, but are often unsatisfactory with respect to the formation of the folded edges because the radii of curvature of the folded edges turn out to be too large. Furthermore "springback" of the material occurs with these methods and leads, because of poor controllability, to a product with an irregular shape. A coining method is also known in which the shaping is carried out by an oscillating coining tool. However, in this method the precision is deficient. In addition, this method is associated with substantial noise generation.

SUMMARY OF THE INVENTION

It is an object of the present invention to provide a method and devices that make it possible to pleat foil strips at a favorable cost and with the required precision.

With the method of the present invention, a wave-like folded or corrugated strip is produced in particular in a first step—the so-called prepleating step—in which the apex lines of the folds represent the forerunners of folded edges. These preformed folded edges are formed in cross-section as arcs with a radius of curvature greater than about 1 mm. The folded or corrugated strip is subsequently subjected to follow-up forming by means of a coining tool in that a folded edge with a predetermined radius of curvature smaller than 1 mm is in each case generated along the apex lines.

The follow-up forming advantageously takes place in two subsequent steps, firstly at each second folded edge and then subsequently at the remaining folded edges. A further advantage is realized in that the fold angle is influenced and the radius of curvature is reduced in a combined manner by a coining tool.

BRIEF DESCRIPTION OF THE DRAWINGS

FIG. 1 is a schematic representation of a plant with which the method of the present invention can be carried out, FIG. 2 is a cross-sectional view through an oscillating coining tool.

DETAILED DESCRIPTION OF THE PREFERRED EXEMPLARY EMBODIMENTS

Figure 4:
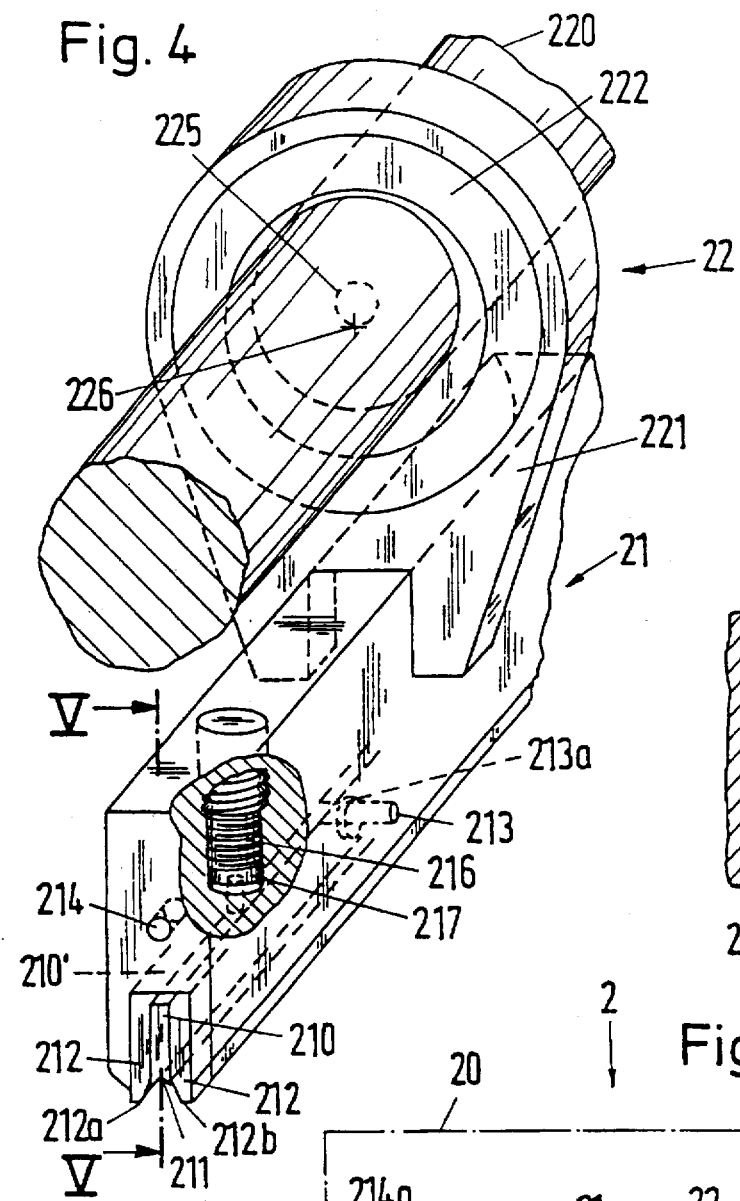
FIG. 4 is a perspective view of a coining tool with eccentric drive for a tumble pressing device.

With the plant illustrated in FIG. 1, a foil-like material strip 100 can be continuously pleated in accordance with the method of the present invention. The folded edges of the pleating extend obliquely to the running direction of the strip 100. The plant has the following components: a pleating roll 10 which has a pair of gearwheel-like rolls which are arranged above one another and of which only the upper one is visible; a first tumble pressing device 1 with which the upper folded edges can be subjected to follow-up forming; a second tumble pressing device 2 for the lower folded edges; and a device 3 which forms a regulating device together with a connection line 3a and a positioning motor 30 arranged at the device 2.

A prepleating takes place in the roll pair 10 in which the foil strip 100 is formed into a corrugated strip 101. The profile of the strip 101 is shown in somewhat exaggerated form in the box a. During the follow-up forming in the device 1, a strip 102 arises with the profile indicated in the box b. In a corresponding manner, a strip 103 with the profile of the box c results in the device 2. In the device 3, the height h of the strip 103 is measured. This measurement parameter is compared in a logic circuit with a desired value and a control signal is generated as a result of a deviation from the desired value. The fold angle is correctively influenced during the second follow-up forming step by means of the positioning motor 30, in dependence on the control signal, in that the spacing between a toothed roll and a coining tool of the tumble pressing device 2 is changed.

In known pleating rolls, the strip experiences an axial displacement during the processing in the roll pair. A continuous process is not possible with such a device. This deficiency can however be overcome with a newly developed pleating roll. Such a new pleating roll is provided in the plant of FIG. 1. It is characterized by the following features:

The teeth of the two rolls consist of movable strip-like elements which are axially displaceable in grooves. Guide means for the teeth are provided in such a way that, as a result of a compulsory guidance of the teeth, the foil strip is transportable on a spatially fixed path.

The prepleating can also be carried out with an oscillating coining tool instead of with a pleating roll. A tool of this kind is shown section-wise in cross-section in FIG. 2. The double-arrow 11 indicates that the upper part 10a executes an oscillating up and down movement, while the lower part 10b forms a spatially fixed counterform to the part 10a. During the coining of the waveshape, the strip 100 is transported further in the running direction by a wavelength λ in the open state of the coining tool. Compared with the prepleating with a pleating roll, the disadvantage arises amongst other things that the throughputs which can be achieved with the oscillating coining tool are less large.

Figure 3:
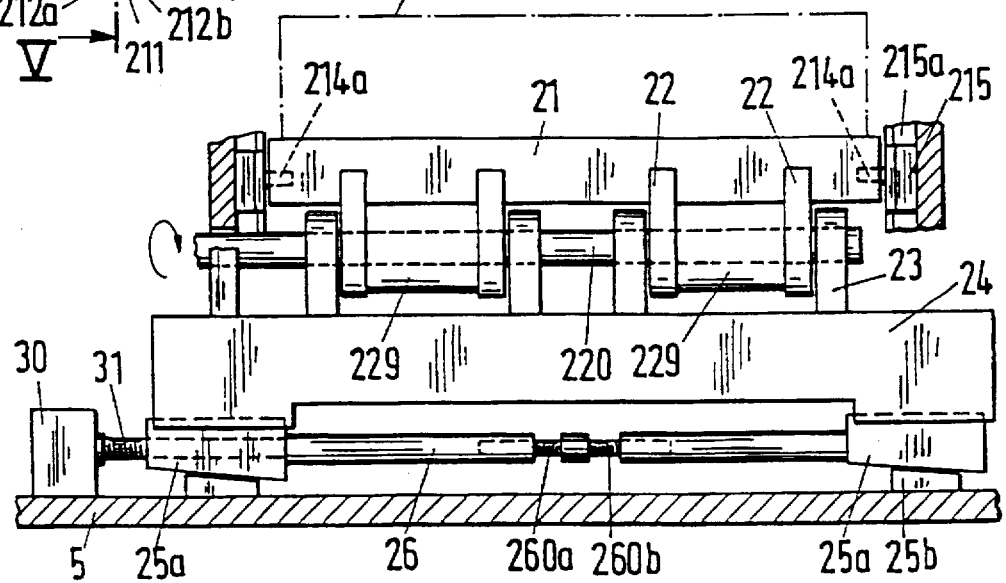
FIG. 3 is a side elevation view of a tumble pressing device which is provided for the follow-up forming of a pleated foil strip.

FIGS. 3 to 7c relate to the follow-up forming with the tumble pressing devices 1 and 2. The two devices 1 and 2 are essentially designed in the same manner. They respectively include a rotatable toothed roll 20 and a coining tool 21 which executes a tumbling movement. In the device 1, the coining tool 21 is arranged above the toothed roll 20; in the device 2 the arrangement is reversed. The device 2, is shown in FIG. 3 and has the positioning motor 30 as an additional component when compared to the device 1. The coining tool 21 of FIG. 4 is shown in the orientation which is present in the device 1.

In the tumble pressing device of FIG. 3 a rotatable toothed roll 20 is only indicated in chain-dotted lines. The coining tool 21 is driven by an eccentric device 22. It is connected via pendulum axles 214a with one slide 215 in each case, which is vertically guided in a rail 215a. An eccentric shaft 220 is rotatably journalled in stands 23 which are secured to a bridge 24. A drive for the shaft 220 is not illustrated. A compensation mass 229 is respectively arranged between two eccentric devices 22.

The bridge 24 can be vertically adjusted by means of wedges 25a—by displacement with respect to spatially fixed wedges 25b which are secured to a base plate 5. A change in height which may be necessary for the purpose of regulating the fold geometry can be effected with the positioning motor 30 and a spindle 31. The horizontal alignment of the bridge 24 can be adjusted in a simple manner as a result of the possibility of changing the length of a connecting rod 26 between the wedges 25a by means of threaded bars 260a and 260b.

FIG. 4 shows details of the coining tool 21 and of the eccentric device 22. The coining tool 21 has a bar-like shape and has a groove for a coining element 210 which is movable in it. The groove is formed by two strip-like elements 212 which themselves lie in a groove 210' and are secured in the latter at the side. In the coining element 210 there is provided a V-shaped groove 211 for the processing of the folded edge. At least one compression spring 216, for example a plate spring, arranged in the coining tool 21 acts on the coining element 210 via a plunger 217. The displaceability of the coining element 210 is restricted to a predetermined interval by pins 213 in elongate holes 213a. The two edges or chamfers 212a and 212b of the elements 212 which extend parallel to the groove 210' define, together with the V-shaped groove 211 of the coining element 210, the geometry of the fold, i.e. of the bending radius and of the fold angle.

Figure 5:
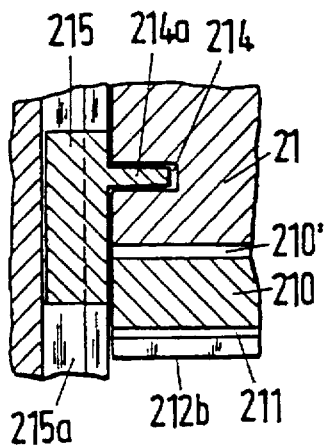
FIG. 5 is a cross-sectional view of a detail relating to the coining tool of FIG. 4.

At each of its two ends, the coining tool 21 has a respective horizontal bore 214 for a pendulum axle 214a. The line V—V in FIG. 4 shows the position of a section through the bore 214. The section is illustrated in FIG. 5. The pendulum axle 214a is connected to a vertically displaceable slider 215 which can slide in a rail 215a.

The center point 226 of the eccentric device 22—see FIG. 4—moves during rotation of the shaft 220 on the eccentric circle 225. The coining tool 21 is secured to the connecting rod 221. Between the connecting rod 221 and the shaft 220 there is located the bearing 222 which is eccentrically arranged relative to the shaft.

FIGS. 6 and 7a–c show the cooperation of the coining tool 21 and the toothed roll 20 during the follow-up forming of the prepleated foil strip 101 or 102, respectively. The significance of the reference numerals which are associated with the parts of the coining tool 21 are already known. For the toothed roll 20 the following association exists for the reference numerals: roll body 200, tooth 201, tooth centerline 202, roll axis 203, and vertical 205 through the axis 203.

Figure 6:
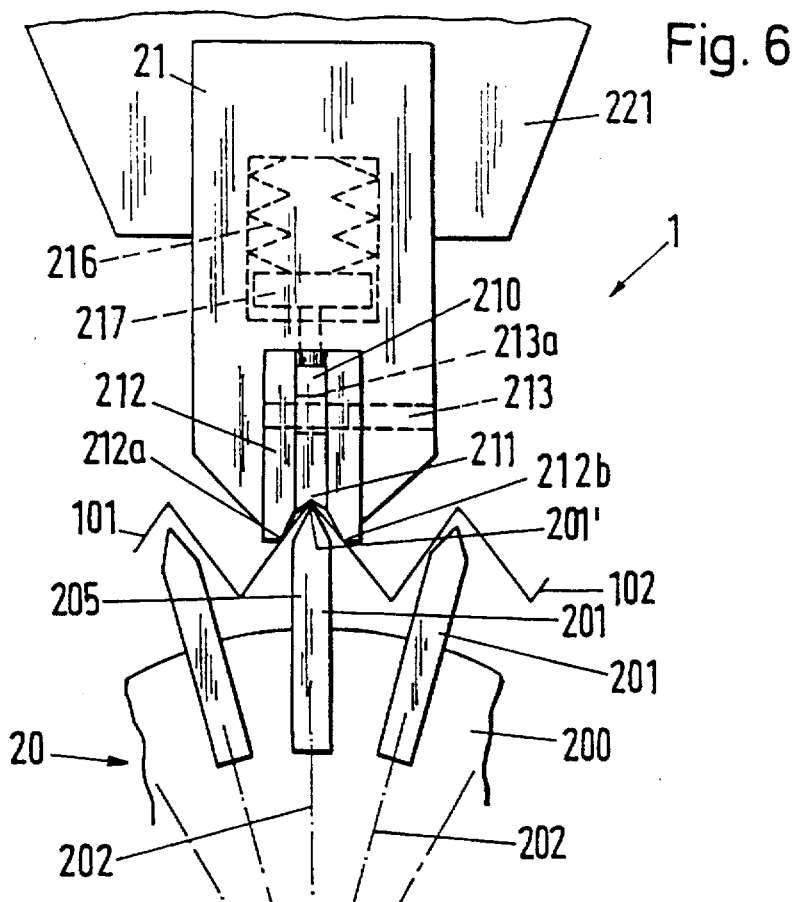
FIG. 6 is an elevation view of a first working phase of the tumble pressing device.

The teeth 201 are secured in grooves of the roll body 200. The angle between adjacent centerlines 202 amounts, for example, to 15°. All centerlines 202 intersect on the roll axis 203. In FIG. 6, the vertical 205 coincides with one centerline 202.

In the working phase of FIG. 6 the coining of one fold angle has just been completed. The tip 201' of the central tooth 201 is located in its maximum engagement with the V-shaped groove 211 of the coining element 210. The radius of curvature of the processed folded edge which lies between the two coining surfaces of the tips 201' and of the groove 211, respectively, has been reduced by the coining process. At the same time, the associated fold angle has been formed by the groove 211 and also the tooth tips 201' and the two edges 212a and 212b.

During the further movement of the coining tool 21 and the toothed roll 20, the spacing between the tooth tips 201' and the coining tool 21 increases again. The coining element 210 is displaced by the compression spring 216 by a short amount out of its groove towards the toothed roll 20. This working phase can be seen in FIG. 7a. In the subsequent working phases shown in FIGS. 7b and 7c a growing gap opens between the cut 211 and the tooth tip 201'.

Figure 7A:
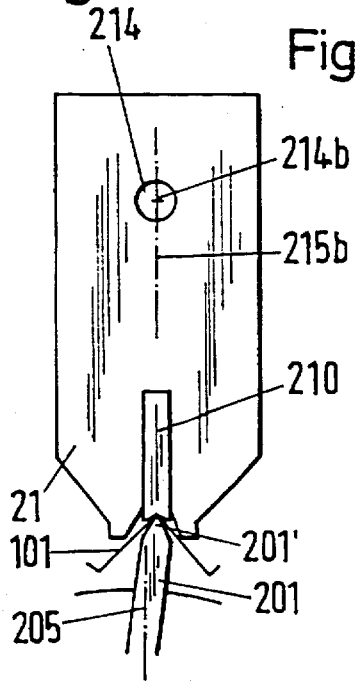
FIGS. 7a–c are elevation views of three further working phases which follow the phase of FIG. 6.
Figure 7B:
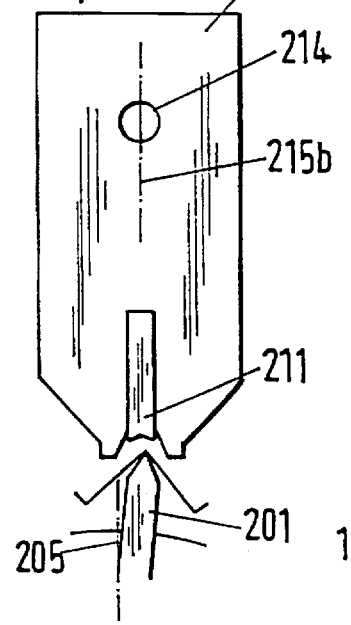
Figure 7C:
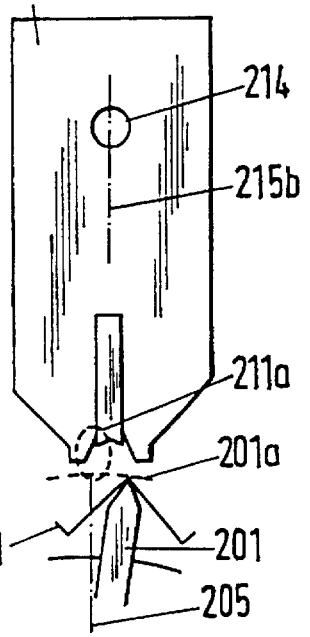

In FIG. 7c, an oval curve 211a represents the track of a groove 211 which is present as a result of the tumbling movement of the eccentric device 22. During this tumbling movement, the centerpoint 214b of the pendulum axle 214a or of the associated bore 214 executes an up and down movement on the vertical 215b which lies on the same lines as the vertical 205. The tooth tip 201' moves on a circular line 201a which intersects the oval 211a at two points. Between these two points of intersection—see the working phase in FIG. 6—the coining element 211 is pressed by the tooth 201 against the force of the spring 216 into the coining tool 21.

It is possible that only the folded edges are to be subjected to follow-up forming with the coining tool of the tumble pressing device. In such a case the two strip-like elements 212 are not necessary and the coining tool need only have the coining element 210 with the V-shaped groove.

What is claimed is:

1. A method for the zigzag-like folding of a strip-like foil, the method comprising:

prepleating with a zigzag-like or wave-like folding pattern such that apex lines of the folding have constant predetermined spacings; and follow-up forming of the folding by tumble pressing at a follow-up forming station, the tumble pressing comprising pinching the strip-like foil between a reciprocating coining tool and a toothed roll such that a folded edge with a predetermined radius of curvature is generated along each of the apex lines.

2. A method in accordance with claim 1 wherein the follow-up forming of the folding includes further tumble pressing at a second follow-up forming station, the further tumble pressing comprising pinching the strip-like foil between a second reciprocating coining tool and a second toothed roll.

3. A method in accordance with claim 2, wherein the prepleating is executed with toothed rolls.

4. A method in accordance with claim 2, wherein the prepleating is executed by pressing with an oscillating coining tool.

5. A method in accordance with claim 2, wherein the foil strip is continuously transported to the follow-up forming stations and is continuously transported through the follow-up forming stations after prepleating has taken place.

6. A method in accordance with claim 5, wherein after the follow-up forming, a characteristic dimension, such as the height of the processed strip, is measured, this measured parameter is compared with a desired value, and the fold angle is correctively influenced during follow-up forming as a result of a deviation from the desired value.

7. A method in accordance with claim 6, wherein the correction of the fold angle is effected during the further tumble pressing.

8. A tumble pressing device for follow-up forming of a strip-like foil that has been prepleated with a zigzag-like or wave-like folding, the device comprising:

a rotatable toothed roll; and a coining tool that is driveable via an eccentric device and is connected via a pendulum axle with a vertically displaceable slider, the coining tool including a groove, a bar-like coining element in the groove, and a V-shaped groove for the working of the folded edge, the coining element being movable against the force of at least one compression spring arranged in the coining tool;

wherein the coining tool is configured such that it can reduce the radius of curvature of a folded edge and can also influence the associated fold angle in cooperation with a respective tooth of the toothed roll.

9. A tumble pressing device in accordance with claim 8 wherein two edges are arranged on the coining tool parallel to the groove of the coining element and are provided together with the V-shaped groove of the coining element for the forming of the fold angle.

10. A tumble pressing device in accordance with claim 9, wherein the eccentric device is displaceably designed in such a way that the spacing between the toothed roll and the coining tool can be varied.

11. A tumble pressing device in accordance with claim 9, wherein a support is displaceably designed in such a way that the spacing between the toothed roll and the coining tool can be varied.

12. A plant for manufacture of a zigzag-like foil strip comprising the following devices arranged in series:

a toothed roll for prepleating;

a first tumble pressing device for follow-up forming; and a second tumble pressing device for further follow-up forming;

wherein each of the pressing devices comprises:

a rotatable toothed roll; and a coining tool that is driveable via an eccentric device and is connected via a pendulum axle with a vertically displaceable slider, the coining tool including a groove, a bar-like coining element in the groove, and a V-shaped groove for the working of the folded edge, the coining element being movable against the force of at least one compression spring arranged in the coining tool;

wherein the coining tool is configured such that it can reduce the radius of curvature of a folded edge and can also influence the associated fold angle in cooperation with a respective tooth of the toothed roll.

13. A plant in accordance with claim 12 wherein a regulating device is present for the adjustment of the fold angle, the regulating device comprising:

a measuring device following the second tumble pressing device for the determination of the height of the folded strip;

a logic circuit for generating a control signal as a result of a measurement effected in the measuring device; and a positioning motor arranged at the second tumble pressing device by means of which the spacing between the toothed roll and the coining tool can be changed in dependence on the control signal.

* * * * *